（12) United States Patent
Geirhofer et al.

(10) Patent No.: US 9,374,253 B2
(45) Date of Patent: Jun. 21, 2016

(54) DM-RS BASED DECODING USING CSI-RS-BASED TIMING

(71) Applicant: QUALCOMM Incorporated, San Diego, CA (US)

(72) Inventors: Stefan Geirhofer, San Diego, CA (US); Wanshi Chen, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 13/738,805

(22) Filed: Jan. 10, 2013

(65) Prior Publication Data

US 2013/0182799 A1 Jul. 18, 2013

Related U.S. Application Data

(60) Provisional application No. 61/586,629, filed on Jan. 13, 2012, provisional application No. 61/706,464, filed on Sep. 27, 2012.

(51) Int. Cl.
*H04W 4/00* (2009.01)
*H04L 27/00* (2006.01)
*H04W 56/00* (2009.01)

(52) U.S. Cl.
CPC .............. *H04L 27/00* (2013.01); *H04W 56/00* (2013.01)

(58) Field of Classification Search
CPC ..... H04L 27/00; H04L 27/2636; H04L 1/004; H04L 5/0048; H04W 56/00; H04B 7/0413; H04B 7/0478

USPC .......... 370/252, 328, 329, 330, 436; 375/340
See application file for complete search history.

(56) References Cited

U.S. PATENT DOCUMENTS

| | | | | |
|---|---|---|---|---|
| 8,238,297 | B2* | 8/2012 | Papasakellariou et al. ... | 370/329 |
| 8,576,784 | B2* | 11/2013 | Löhr et al. ..................... | 370/329 |
| 8,625,516 | B2* | 1/2014 | Lindoff et al. ................ | 370/329 |
| 8,780,863 | B2* | 7/2014 | Cheng et al. .................. | 370/331 |
| 8,842,620 | B2* | 9/2014 | Hu et al. ....................... | 370/329 |
| 2011/0038302 | A1* | 2/2011 | Papasakellariou et al. ... | 370/315 |
| 2011/0085460 | A1* | 4/2011 | Zhang ................. | H04W 56/005 370/252 |
| 2011/0142003 | A1 | 6/2011 | Kuchi et al. | |
| 2012/0076106 | A1 | 3/2012 | Bhattad et al. | |

(Continued)

OTHER PUBLICATIONS

Alcatel-Lucent et al: "Further Discussion of Quasi-co-located antenna ports", 3GPP Draft; R1-122458 Antenna Collocation, 3rd Generation Partnership Project (3GPP), Mobile Competence Centre ; 650, Route Des Lucioles ; F-06921 Sophia-Antipolis Cedex; France, vol. RAN WG1, no. Prague, Czech Republic; May 21, 2012-May 25, 2012, May 13, 2012, XP050601103,[retrieved on May 13, 2012] the whole document.

(Continued)

*Primary Examiner* — Brian O'Connor
(74) *Attorney, Agent, or Firm* — Patterson & Sheridan, L.L.P.

(57) ABSTRACT

Certain aspects of the present disclosure relate to a method of wireless communication that includes receiving one or more channel state information reference signal (CSI-RS) resources. The method further includes performing timing estimation based on the one or more CSI-RS resources, receiving a demodulation reference signal (DM-RS) based transmission, and utilizing the timing estimation to decode the DM-RS based transmission.

67 Claims, 10 Drawing Sheets

(56) References Cited

U.S. PATENT DOCUMENTS

| | | | |
|---|---|---|---|
| 2012/0106374 A1 | 5/2012 | Gaal et al. | |
| 2012/0176982 A1 | 7/2012 | Zirwas et al. | |
| 2012/0176995 A1* | 7/2012 | Parkvall et al. | 370/329 |
| 2012/0257515 A1* | 10/2012 | Hugl et al. | 370/252 |
| 2013/0003663 A1* | 1/2013 | Blankenship et al. | 370/329 |
| 2013/0155974 A1* | 6/2013 | Papasakellariou et al. | 370/329 |
| 2013/0163499 A1* | 6/2013 | Cheng et al. | 370/312 |
| 2013/0272158 A1* | 10/2013 | Park et al. | 370/252 |
| 2013/0279544 A1* | 10/2013 | Papasakellariou et al. | 375/146 |
| 2014/0247775 A1* | 9/2014 | Frenne et al. | 370/329 |

OTHER PUBLICATIONS

ETSI: "LTE: EvolvedUniversal Terrestrial Radio Access (E-UTRA); Physical channel and modulation; (3GPP TS 36.211 version 10.0.0 Release 10)", , Jan. 2011, XP002694954, Retrieved from the Internet: URL:http://www.etsi.org/deliver/etsi_ts/136200_136299/136211/10.00.00_60/ts_136211v100000p.pdf[retrieved on Apr. 4, 2013].
International Search Report and Written Opinion—PCT/US2013/021126—ISA/EPO—Apr. 19, 2013.
New Postcom: "Discussions on quasi-co-located antenna ports (R1-123440)", Aug. 6, 2012, XP002694932, Retrieved from the Internet: URL:http://www.3gpp.org/ftp/tsg_ran/wg1_rl1/TSGR1_70/Docs/ [retrieved on Apr. 5, 2013] the whole document.
Renesas Mobile Europe Ltd: "Co-located and non-colocated antenna ports", 3GPP Draft; R1-121369, 3rd Generation Partnership Project (3GPP), Mobile Competence Centre ; 650, Route Des Lucioles ; F-06921 Sophia-Antipolis Cedex; France, vol. RAN WG1, no. Jeju, Korea; Mar. 26, 2012-Mar. 30, 2012, Mar. 20, 2012, XP050599656, [retrieved on Mar. 20, 2012] the whole document.

* cited by examiner

Table 1 SRPI of Macro eNB

| Index | 0 | 1 | 2 | 3 | 4 | 5 | 6 | 7 |
|---|---|---|---|---|---|---|---|---|
| SRPI value | X | X | X | U | X | X | X | N |

Table 2 SRPI of Femto eNB

| Index | 0 | 1 | 2 | 3 | 4 | 5 | 6 | 7 |
|---|---|---|---|---|---|---|---|---|
| SRPI value | X | X | X | N | X | X | X | U |

FIG. 5

DM-RS BASED DECODING USING CSI-RS-BASED TIMING

CLAIM OF PRIORITY UNDER 35 U.S.C. §119

This application claims benefit of U.S. Provisional Patent Application No. 61/706,464, filed Sep. 27, 2012, which is herein incorporated by reference in its entirety, and U.S. Provisional Patent Application No. 61/586,629, filed Jan. 13, 2012, which is herein incorporated by reference in its entirety.

BACKGROUND

I. Field

Certain aspects of the disclosure generally relate to wireless communications and, more particularly, to techniques for demodulation reference signal (DM-RS) based decoding using Channel State Information Reference Signals (CSI-RS) based timing.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes receiving one or more channel state information reference signal (CSI-RS) resources, performing timing estimation based on the one or more CSI-RS resources, receiving a demodulation reference signal (DM-RS) based transmission, and utilizing the timing estimation to decode the DM-RS based transmission.

In another aspect, a method for wireless communications is provided. The method generally includes transmitting signaling that indicates, to a user equipment (UE), a set of one or more channel state information reference signal (CSI-RS) resources to be used for performing timing estimation, and sending a demodulation reference signal (DM-RS) based transmission to the UE, the DM-RS transmission to be decoded by the UE, based on the timing estimation performed using the indicated CSI-RS resources.

In an aspect, an apparatus for wireless communications is provided. The apparatus generally includes means for receiving one or more channel state information reference signal (CSI-RS) resources, means for performing timing estimation based on the one or more CSI-RS resources, means for receiving a demodulation reference signal (DM-RS) based transmission, and means for utilizing the timing estimation to decode the DM-RS based transmission.

In an aspect, an apparatus for wireless communications is provided. The apparatus generally includes means for transmitting signaling that indicates, to a user equipment (UE), a set of one or more channel state information reference signal (CSI-RS) resources to be used for performing timing estimation, and means for sending a demodulation reference signal (DM-RS) based transmission to the UE, the DM-RS transmission to be decoded by the UE, based on the timing estimation performed using the indicated CSI-RS resources.

In an aspect, a user equipment is provided. The user equipment generally includes at least one processor and a memory coupled to the at least one processor, wherein the processor is generally configured for receiving one or more channel state information reference signal (CSI-RS) resources, performing timing estimation based on the one or more CSI-RS resources, receiving a demodulation reference signal (DM-RS) based transmission, and utilizing the timing estimation to decode the DM-RS based transmission.

In an aspect, a base station is provided. The base station generally includes at least one processor and a memory coupled to the at least one processor, wherein the processor is generally configured to transmit signaling that indicates, to a user equipment (UE), a set of one or more channel state information reference signal (CSI-RS) resources to be used for performing timing estimation, and send a demodulation reference signal (DM-RS) based transmission to the UE, the DM-RS transmission to be decoded by the UE, based on the timing estimation performed using the indicated CSI-RS resources.

In an aspect, a computer program product comprising a computer-readable medium having instructions stored thereon is provided. The instructions are generally executable by one or more processors for receiving one or more channel state information reference signal (CSI-RS) resources, performing timing estimation based on the one or more CSI-RS resources, receiving a demodulation reference signal (DM-RS) based transmission, and utilizing the timing estimation to decode the DM-RS based transmission.

In an aspect, a computer program product comprising a computer-readable medium having instructions stored thereon is provided. The instructions are generally executable by one or more processors for transmitting signaling that indicates, to a user equipment (UE), a set of one or more channel state information reference signal (CSI-RS) resources to be used for performing timing estimation, and sending a demodulation reference signal (DM-RS) based transmission to the UE, the DM-RS transmission to be decoded by the UE, based on the timing estimation performed using the indicated CSI-RS resources.

Various aspects and features of the disclosure are described in further detail below.

BRIEF DESCRIPTION OF THE DRAWINGS

FIG. 5 illustrates example resource partitioning in a heterogeneous network in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
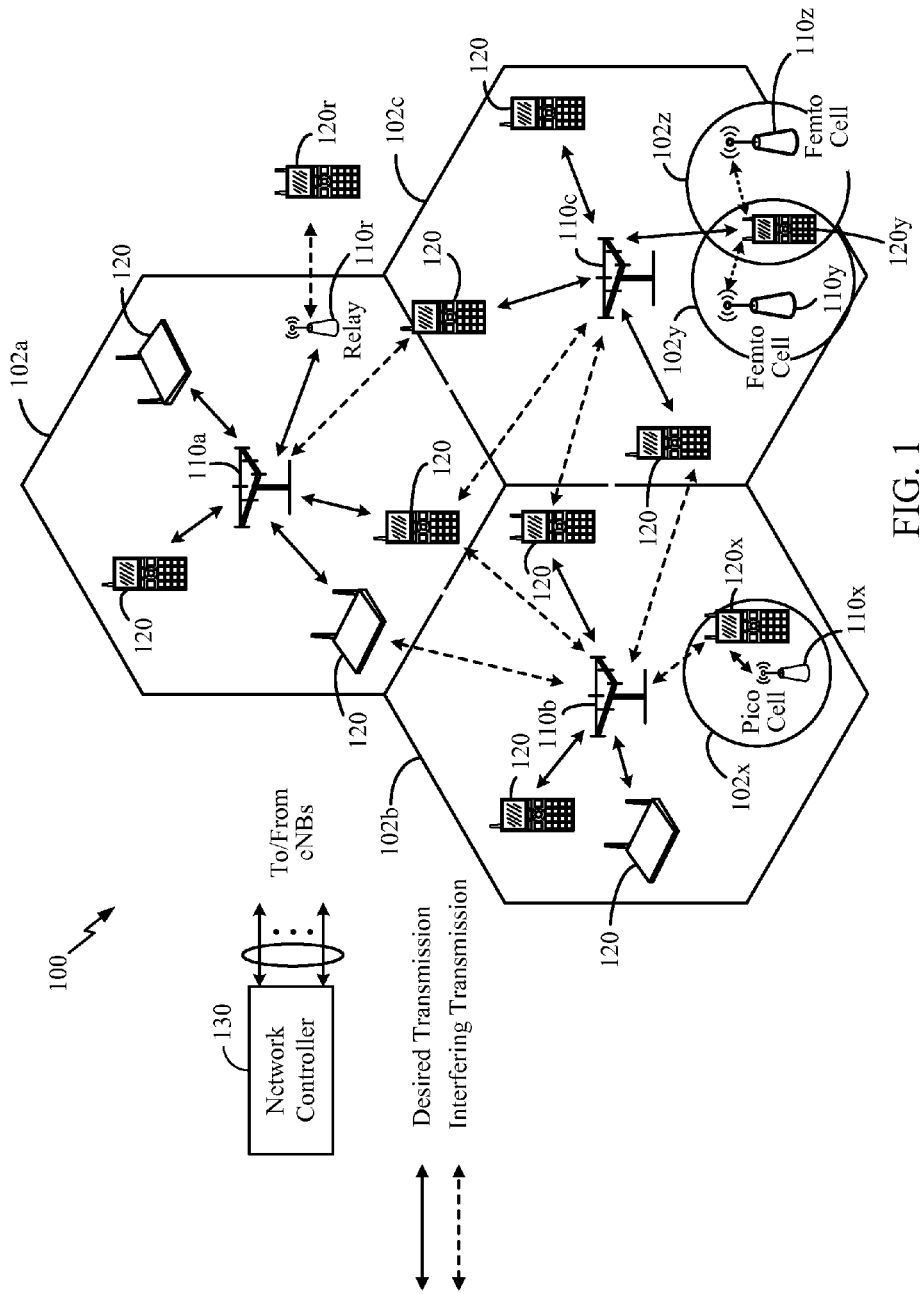
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
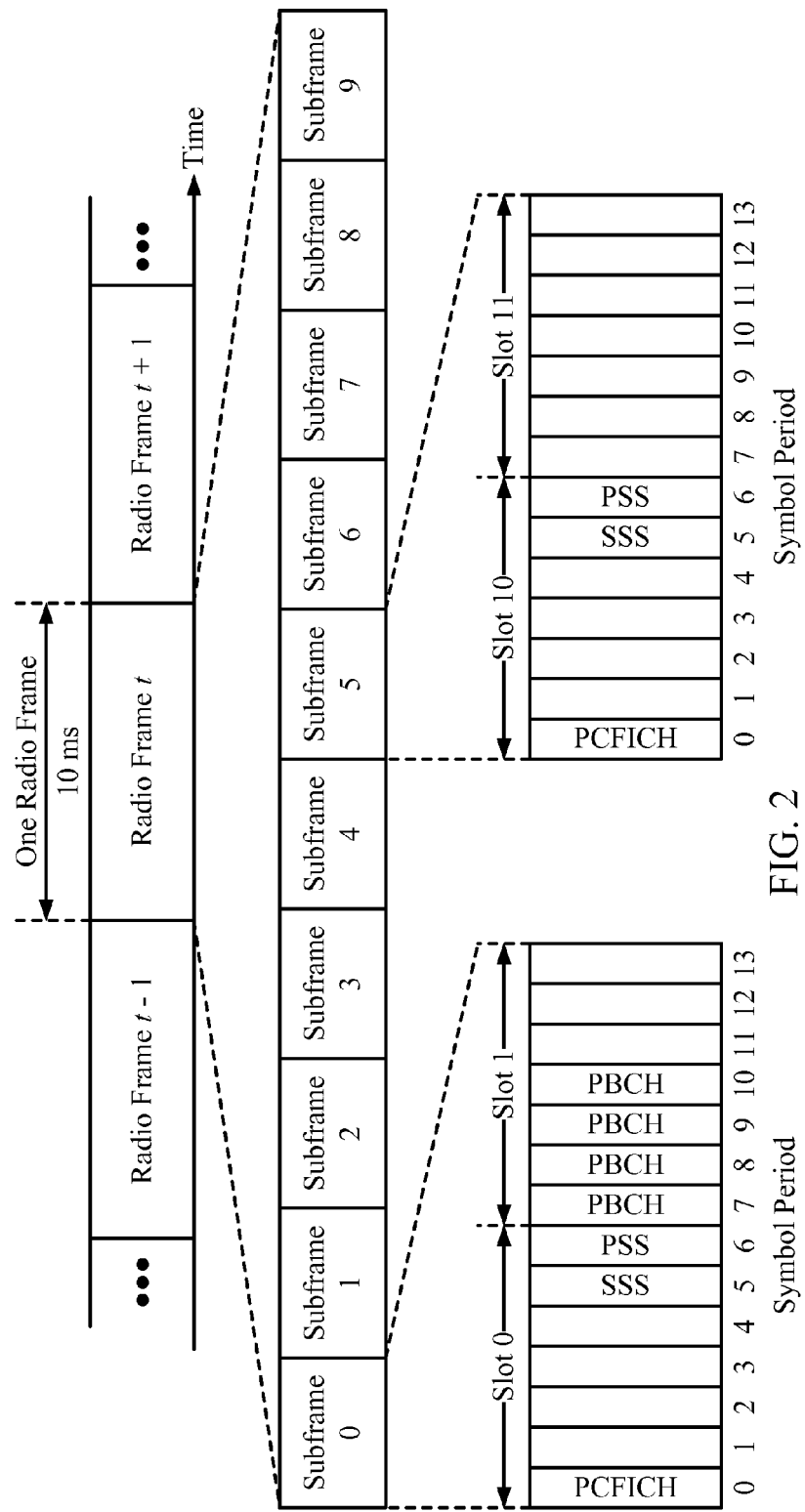
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
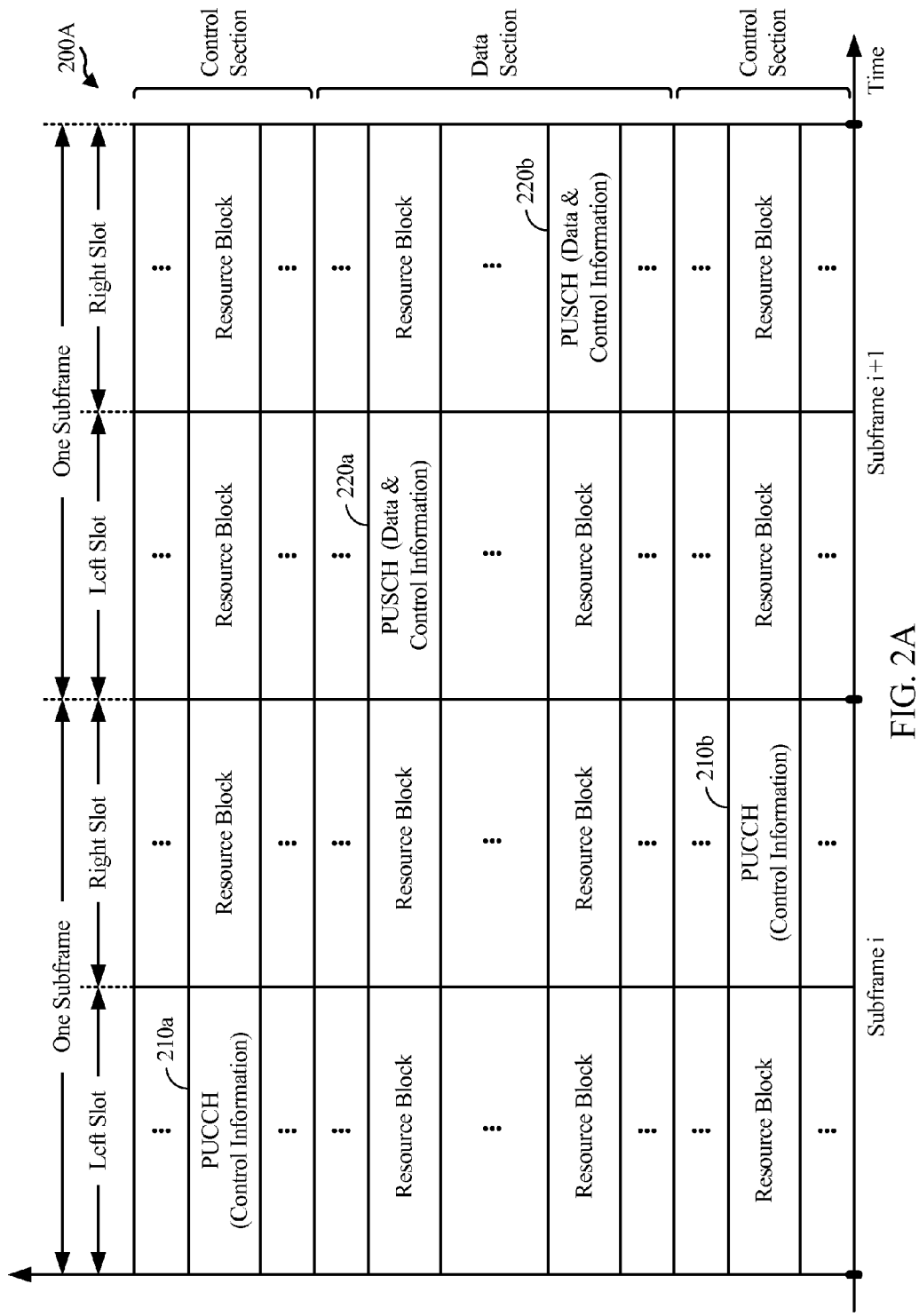
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE $120y$ may be close to femto eNB $110y$ and may have high received power for eNB $110y$. However, UE $120y$ may not be able to access femto eNB $110y$ due to restricted association and may then connect to macro eNB $110c$ with lower received power (as shown in FIG. 1) or to femto eNB $110z$ also with lower received power (not shown in FIG. 1). UE $120y$ may then observe high interference from femto eNB $110y$ on the downlink and may also cause high interference to eNB $110y$ on the uplink.

A dominant interference scenario may also occur due to range extension, which is a scenario in which a UE connects to an eNB with lower pathloss and lower SNR among all eNBs detected by the UE. For example, in FIG. 1, UE $120x$ may detect macro eNB $110b$ and pico eNB $110x$ and may have lower received power for eNB $110x$ than eNB $110b$. Nevertheless, it may be desirable for UE $120x$ to connect to pico eNB $110x$ if the pathloss for eNB $110x$ is lower than the pathloss for macro eNB $110b$. This may result in less interference to the wireless network for a given data rate for UE $120x$.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

Figure 3:
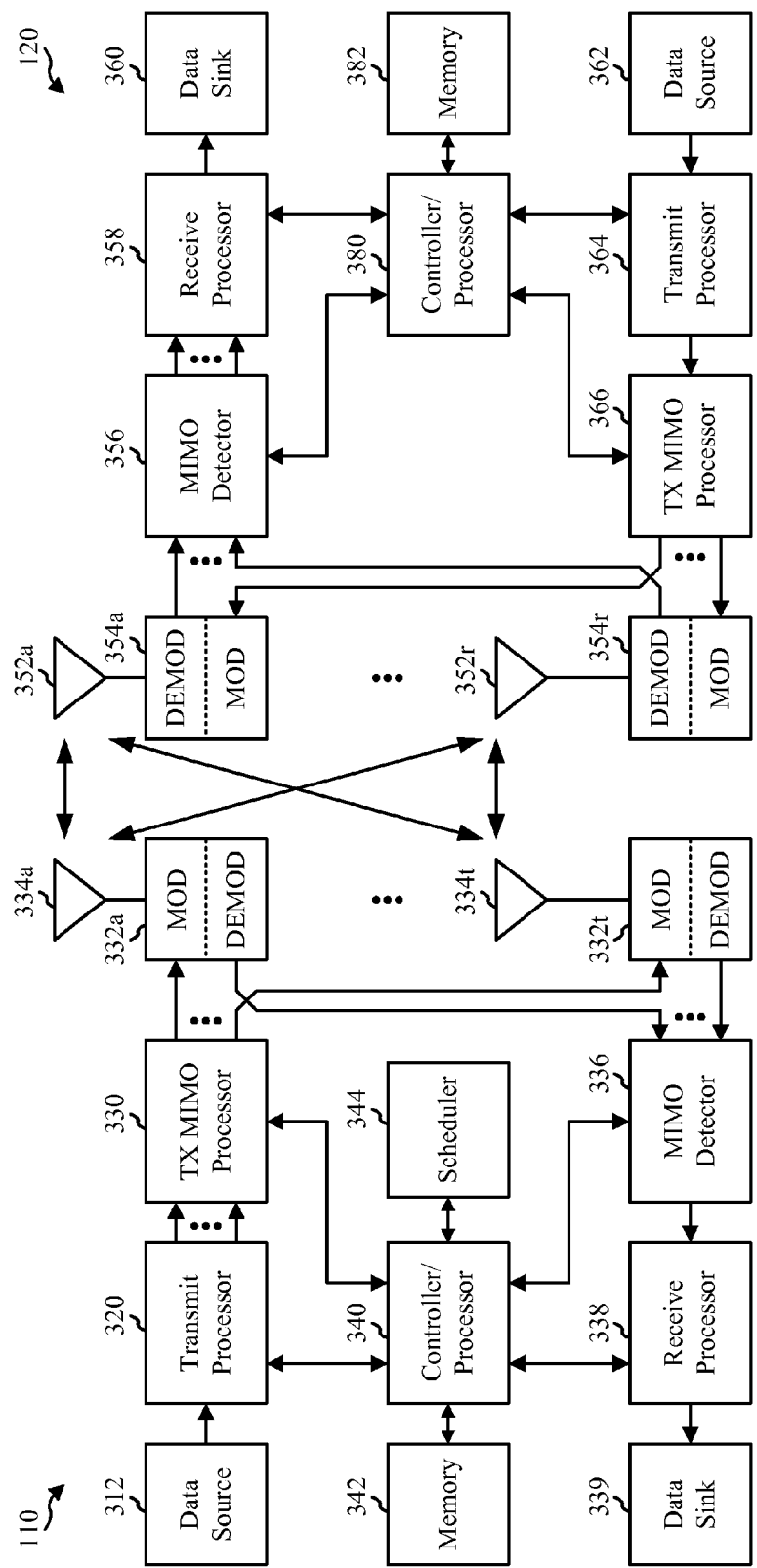
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB $110c$ in FIG. 1, and the UE 120 may be UE $120y$. The eNB 110 may also be a base station of some other type. The eNB 110 may be equipped with T antennas $334a$ through $334t$, and the UE 120 may be equipped with R antennas $352a$ through $352r$, where in general $T \geq 1$ and $R \geq 1$.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) $332a$ through $332t$. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators $332a$ through $332t$ may be transmitted via T antennas $334a$ through $334t$, respectively.

At the UE 120, antennas $352a$ through $352r$ may receive the downlink signals from the eNB 110 and may provide received signals to demodulators (DEMODs) $354a$ through $354r$, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators $354a$ through $354r$, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators $354a$ through $354r$ (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations 1000 in FIG. 10 and/or other processes for the techniques described herein. The memories 342 and 382 may store data and program codes for the eNB 110 and the UE 120, respectively. A scheduler 344 may schedule UEs for data transmission on the downlink and/or uplink.

Example Resource Partitioning

According to certain aspects of the present disclosure, when a network supports enhanced inter-cell interference coordination (eICIC), the base stations may negotiate with each other to coordinate resources in order to reduce or eliminate interference. The interference may be eliminated or reduced by the interfering cell giving up part of its resources. Interference coordination may enable a UE to access a serving cell, even with severe interference, by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may not use—yield—some of the subframes in the time domain. When the coordinated resource partitioning is frequency based, the interfering cell may yield subcarriers in the frequency domain. When the coordinated resource partitioning is both frequency and time based, the interfering cell may yield a combination of both frequency and time resources.

Figure 4:
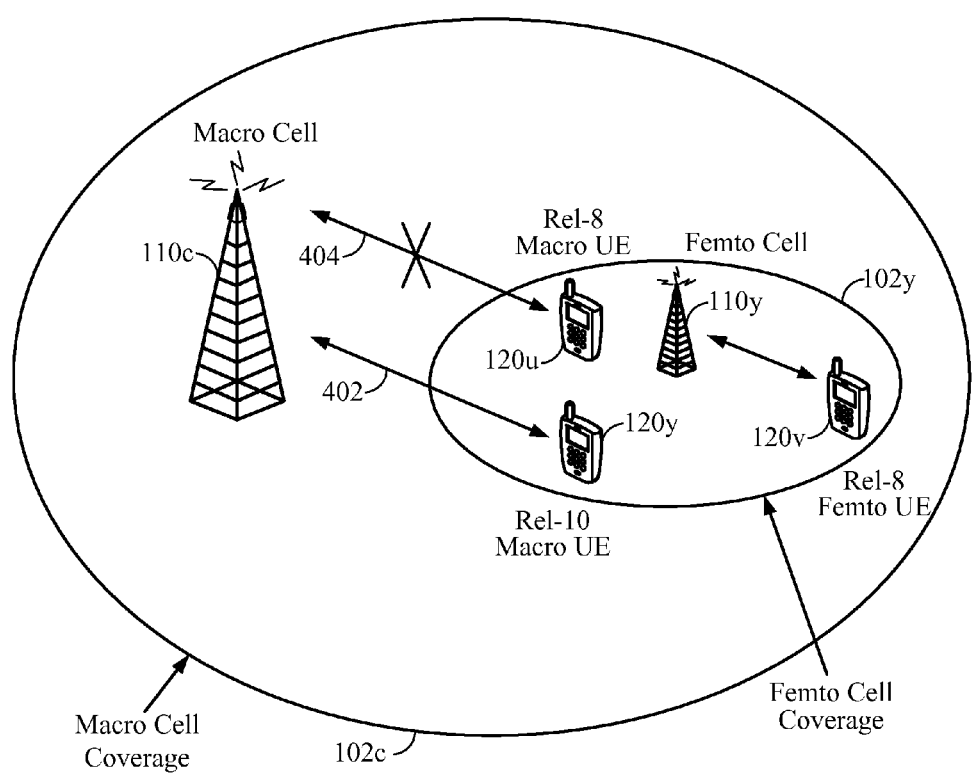
FIG. 4 illustrates an example heterogeneous network (HetNet) in accordance with certain aspects of the present disclosure.

FIG. 4 illustrates an example scenario where eICIC may allow a macro UE 120y supporting eICIC (e.g., a Rel-10 macro UE as shown in FIG. 4) to access the macro cell 110c even when the macro UE 120y is experiencing severe interference from the femto cell 110y, as illustrated by the solid radio link 402. A legacy macro UE 120u (e.g., a Rel-8 macro UE as shown in FIG. 4) may not be able to access the macro cell 110c under severe interference from the femto cell 110y, as illustrated by the broken radio link 404. A femto UE 120v (e.g., a Rel-8 femto UE as shown in FIG. 4) may access the femto cell 110y without any interference problems from the macro cell 110c.

Networks which have different sets of partitioning information may support eICIC. One type of partitioning information sets may be referred to as Semi-static Resource Partitioning Information (SRPI). SRPI typically does not change frequently, and SRPI may be sent to a UE so that the UE can use the resource partitioning information for the UE's own operations. Another set of partitioning information may be referred to as Adaptive Resource Partitioning Information (ARPI).

In some embodiments, the resource partitioning may be implemented with 8 ms periodicity (8 subframes) or 40 ms periodicity (40 subframes). In some embodiments, frequency division duplexing (FDD) may be applied to partition frequency resources as well. For downlink communications (e.g., from a cell node B to a UE), a partitioning pattern may be mapped to a known subframe (e.g., a first subframe of each radio frame that has a system frame number (SFN) value that is a multiple of an integer N, such as 4). Mapping a partitioning pattern may be applied in order to determine resource partitioning information (RPI) for a particular subframe. As an example, a subframe that is subject to coordinated resource partitioning (e.g., yielded by an interfering cell) for the downlink may be identified by an index:

$$Index_{SRPI\_DL}=(SFN*10+subframe\ number)\bmod 8$$

For the uplink, the SRPI mapping may be shifted, for example, by 4 ms.
Thus, an example for the uplink may be:

$$Index_{SRPI\_UL}=(SFN*10+subframe\ number+4)\bmod 8$$

SRPI may use the following three values for each entry:
U (Use): this value indicates the subframe has been cleaned up from the dominant interference to be used by this cell (i.e., the main interfering cells do not use this subframe);
N (No Use): this value indicates the subframe shall not be used; and
X (Unknown): this value indicates the subframe is not statically partitioned.

Details of resource usage negotiation between base stations are not known to the UE.

Another possible set of parameters for SRPI may be the following:
U (Use): this value indicates the subframe has been cleaned up from the dominant interference to be used by this cell (i.e., the main interfering cells do not use this subframe);
N (No Use): this value indicates the subframe shall not be used;

X (Unknown): this value indicates the subframe is not statically partitioned (and details of resource usage negotiation between base stations are not known to the UE); and
C (Common): this value may indicate all cells may use this subframe without resource partitioning. This subframe may be subject to interference, so that the base station may choose to use this subframe only for a UE that is not experiencing severe interference.

The serving cell's SRPI may be broadcasted over the air. In E-UTRAN, the SRPI of the serving cell may be sent in a master information block (MIB), or one of the system information blocks (SIBs). A predefined SRPI may be defined based on the characteristics of cells, e.g. macro cell, pico cell (with open access), and femto cell (with closed access). In such a case, encoding of SRPI in the system overhead message may result in more efficient broadcasting over the air.

The base station may also broadcast the neighbor cell's SRPI in one of the SIBs. The SRPI may also be sent with its corresponding range of physical cell identities (PCIs).

ARPI may represent further resource partitioning information with the detailed information for the 'X' subframes in SRPI. As noted above, detailed information for the 'X' subframes is typically only known to the base stations, and unknown to the UE.

Figure 6:
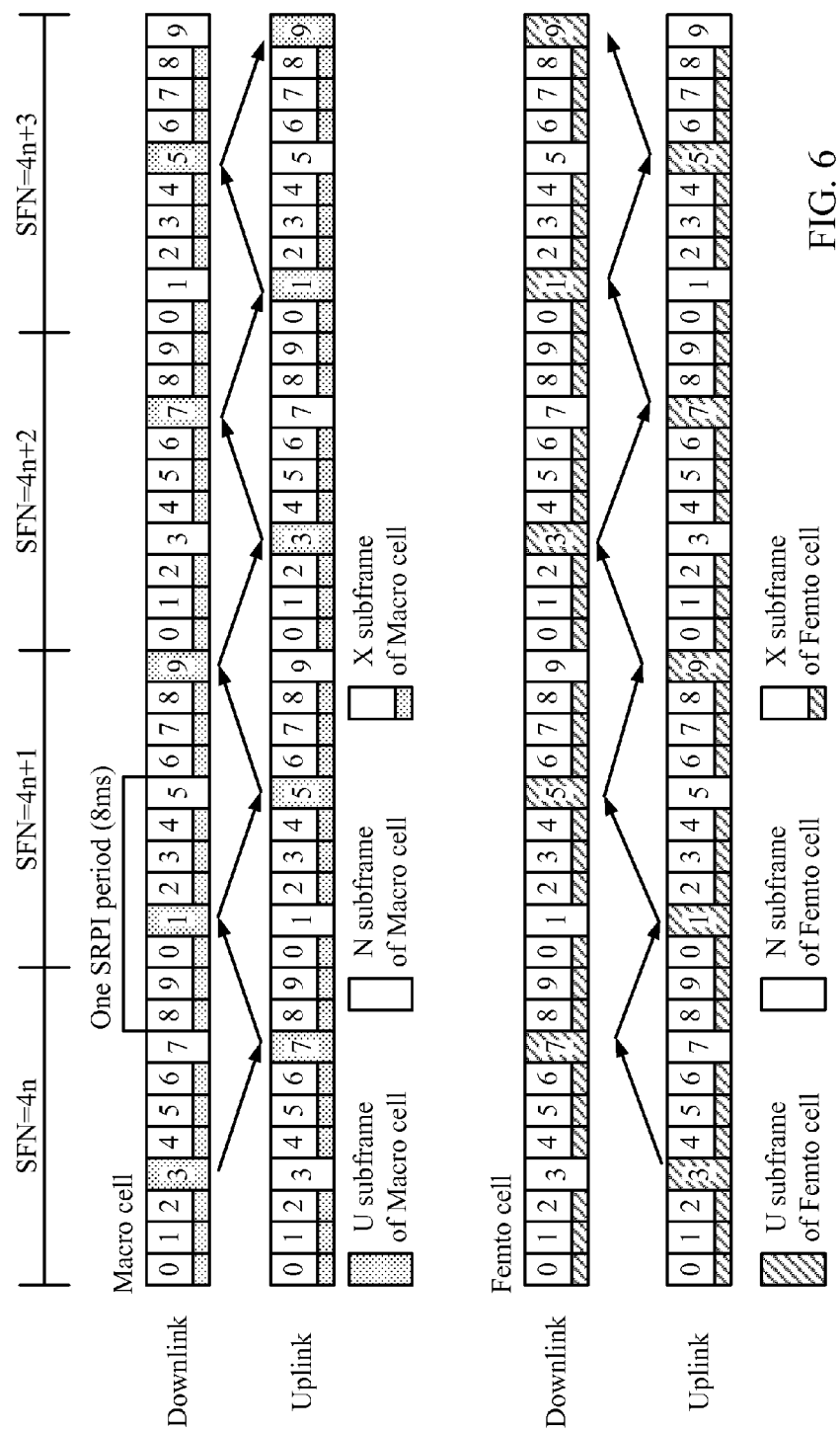
FIG. 6 illustrates example cooperative partitioning of subframes in a heterogeneous network in accordance with certain aspects of the present disclosure.

FIGS. 5 and 6 illustrate examples of SRPI assignment in a scenario involving macro and femto cells. A U, N, X, or C subframe is a subframe corresponding to a U, N, X, or C SRPI assignment.

DM-RS Based Decoding Using CSI-RS-Based Timing

Control/data decoupling is of importance with respect to coordinated multipoint (CoMP) transmission and reception in heterogeneous networks (HetNet). Dynamic transmission point selection may require control/data decoupling. A variety of CoMP scenarios may be considered, two of which are listed below.

In one embodiment, transmission points share the same cell-ID. Consequently, control information transmitted via the PDCCH is common to all transmission points in the CoMP cluster.

In another embodiment, transmission points have different cell-IDs. In this scenario, a UE may receive control information from a transmission point that is different from the transmission point of data. For example, control information may be received on legacy PDCCH from a macro-cell whereas data may be received from Remote Radio Heads (RRHs).

For control and data decoupling, the transmission point for control information (at least for legacy PDCCH) stays fixed and the transmission point for data may change dynamically from subframe to subframe. The dynamic changes are transparent to the UE due to demodulation reference signals (DM-RS).

The control and data decoupling may be complex in terms of DM-RS based timing estimation. For small allocations (e.g., 1 PRB), decoding performance may be poor.

According to certain aspects of the invention, Channel State Information Reference Signal (CSI-RS) resources may be considered as a means for timing estimation. In Rel-11, multiple non-zero power CSI-RS resources will be available. This may be required for supporting dynamic point selection (DPS), wherein the serving transmission point for data transmission may change from sub-frame to sub-frame. For DPS-CoMP, each of these CSI-RS resources may correspond to one serving hypothesis.

Any of the multiple CSI-RS resources may be used for timing estimation. It may be noted that timing may also differ across different CSI-RS resources due to time misalignment and propagation delay differences. This may be taken into account as part of Coordinated MultiPoint (CoMP) Channel State Information (CSI) feedback reporting.

Figure 7:
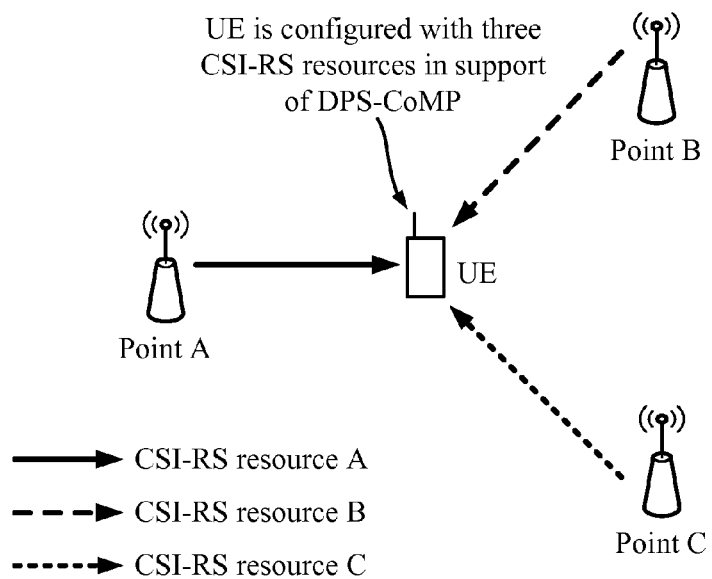
FIG. 7 illustrates an example scenario of a CSI-RS transmission for feedback in accordance with certain aspects of the present disclosure.

FIG. 7 illustrates an example of CSI-RS transmission for feedback, according to an aspect of the invention. The example of in FIG. 7 illustrates three (3) CSI-RS resources A, B and C in support of DPS-CoMP, each corresponding to one transmission point A, B and C, respectively.

Figure 8:
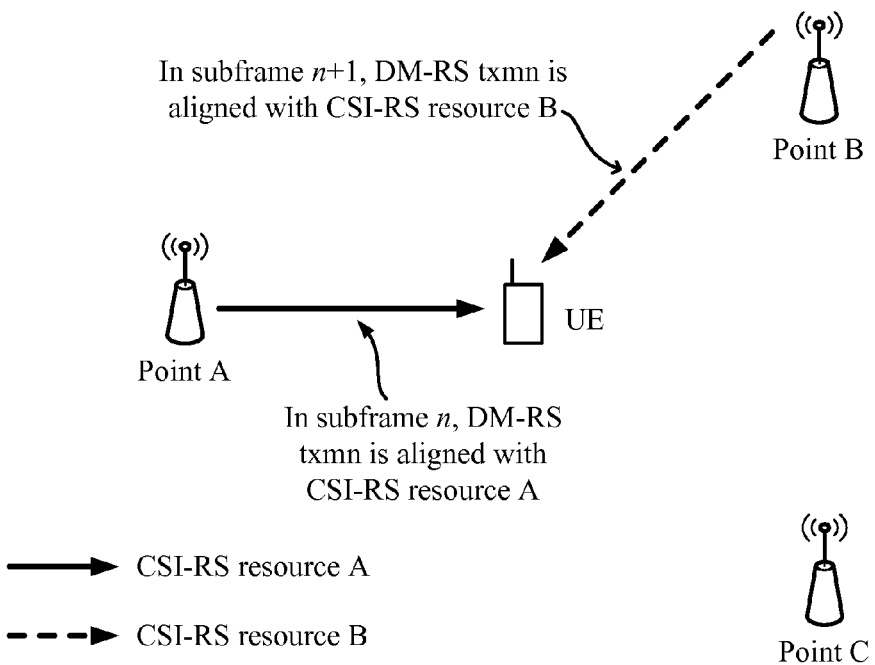
FIG. 8 illustrates an example scenario of a DM-RS transmission for demodulation in accordance with certain aspects of the present disclosure.

FIG. 8 illustrates a DM-RS transmission for demodulation, according to an aspect of the invention. In the example of FIG. 8, when the network switches between transmission points A and B for serving data transmission, the UE is informed—via, for example, 1-2 bits in the grant—which of the CSI-RS resources should be used for the timing estimation. The information indicates which of the transmission points is actually transmitting to the UE. It should be noted that the one-to-one association of CSI-RS resources and transmission points used in the figures serves only as an example. In some embodiments, a CSI-RS resource may span more than a single transmission point.

Timing derived from CSI-RS may be different from the CRS-based timing of the serving cell (for example, due to control/data decoupling). One solution is to estimate the timing of a DM-RS based transmission based on the DM-RS pilots that are embedded in the same resources on which the data is also transmitted. However, since the DM-RS is present only on those resources assigned to a specific UE, decoding performance may suffer compared to the case in which the common reference signal (CRS) is used for timing estimation since the CRS is transmitted wideband and is available in every subframe. It should also be noted that from the viewpoint of a specific UE, it may generally not be possible to average timing estimates across subframes since the DM-RS is present only when this specific UE is scheduled (which may not occur in every subframe).

CSI-RS based timing estimation is an alternative to DM-RS based timing estimation. However, linkage between CSI-RS and DM-RS may still be absent. Even if CSI-RS resources are used for timing estimation, the UE does not know which of these configured CSI-RS resources should be used for timing estimation when it receives a DM-RS based PDSCH transmission. According to example embodiments, this information may be either implicitly or explicitly signaled.

To explicitly signal the UE, the signaling indicates CSI-RS resources to be used for performing the timing estimation in a subframe via at least one bit included in a grant of the DM-RS based transmission or scheduled data transmission. This is a relatively flexible option, but requires additional payload in the grant (for example, 1-2 bits). The bits may used to index the set of configured CSI-RS resources. This dynamic explicitly signaled indication of the CSI-RS resource to be used for timing estimation may only apply to the DM-RS based PDSCH transmission occurring in the same subframe.

To implicitly signal the UE, signaling indicates CSI-RS resources to be used for performing the timing estimation in a subframe via the scrambling code identity (SCID) bit in the grant. Thus, the timing estimation is tied to a virtual cell ID. Instead of introducing new bit(s) in the grant—as for explicit signaling—the existing SCID bit in the grant is reused to provide the signaling. However, implicit signaling may be limited to switching between only two different values: one CSI-RS resource associated with one virtual cell ID and one CSI-RS resource associated with the other virtual cell ID.

According to some embodiments, a virtual cell ID may not correspond to the serving cell, but may correspond to a cell ID that is in a range of admissible cell ID values. It should further be noted that if dynamic signaling of more than two virtual cell IDs for the DM-RS scrambling sequence is supported, the above concept may equally apply to more than two virtual cell-IDs.

If the UE is dynamically signaled regarding which virtual cell-ID to assume (e.g., through the SCID bit in the grant), CSI-RS resources may be semi-statically tied to either virtual cell ID. This mapping may be 1-to-1 or 1-to-many, where one or more CSI-RS resources are associated with each virtual cell-ID.

In some embodiments, signaling may be aligned with other CSI-RS resource signaling, for example, feedback reporting. In one exemplary embodiment, an aperiodic feedback report is requested (e.g., through a grant) from a specific UE. If the UE is configured with more than one CSI-RS resource, this request may need to indicate which of the CSI-RS resources should be reported. The request may be sent in a first subframe. Then, in a second subframe, subsequent to the first subframe, the UE receives the DM-RS based data transmission and the UE may use the same CSI-RS resource used for reporting CSI as the source for deriving timing of the received DM-RS based data transmission. To avoid confusion in the case when multiple aperiodic feedback requests are received across subframes, autonomous selection of the CSI-RS based timing resource may be based on the last received aperiodic feedback request, possibly subject to some offset to account for processing delays.

It should further be noted that this concept may be extended to cases in which the CSI-RS resource indication is not present in the grant that requests an aperiodic feedback report. For example, if upon reception of an aperiodic feedback request, the UE is allowed to autonomously select which CSI-RS resource to report, the same procedure would apply for selecting the timing source (e.g., replacing the signaled CSI-RS resource for reporting with the one indicated by the UE).

In some embodiments, an override flag may be transmitted whenever the eNB decides to deviate from the above procedure.

For any of the above options, signaling may be combined with resource-restricted CSI measurements and feedback reporting configurations. For example, different mappings may be implemented on different subframe sets as configured by higher layers.

Example embodiments are also directed to cross carrier scheduling aspects. Cross carrier scheduling may be combined with the implicit/explicit signaling options. In this way, the UE may be informed at least one subframe in advance about the timing to assume in a future subframe. This may be useful in some implementations where the UE could align its FFT window for a future transmission. For example, a UE that performs two FFTs, could keep one always aligned with the serving cell's control transmission (e.g., to decode PDCCH). The other FFT may be aligned with the timing of a decoupled ctrl/data or DPS transmission as signaled. In line with the above, other implementation specific components may also be aligned in advance with a signaled transmission in a future subframe.

Although, the example embodiments discussed above may concern PDSCH transmissions, these may equally be applied to DM-RS based evolved PDCCH (EPDCCH) transmissions that may utilize what is conventionally a data region of the subframe and may be narrow-band, since the transmission point for EPDCCH may also change dynamically and/or be transparent to the UE.

Quasi-Co-Location Signaling

The signaling provided in the above examples may be referred to as a form of "quasi-co-location" signaling as it informs the UE which set of reference signals, including but not limited to CSI-RS resources, DM-RS, and CRS, may be assumed as co-located by the UE. In the above discussion, this quasi-co-location signaling focused on dynamic quasi-co-location signaling of a specific CSI-RS resource and the PDSCH DM-RS.

In another aspect of this invention, this quasi-co-location signaling may be extended to include the CRS. In multi-cell scenarios where transmission points are associated with different cell IDs, quasi-co-location signaling enables the UE to perform further enhanced time and/or frequency estimation associated with PDSCH or EPDCCH demodulation. This is useful because the CRS is a denser reference signaling that may allow for improved performance.

In one embodiment, quasi-co-location signaling of the CRS associated with a specific physical cell ID and the DM-RS may be based in part on the aforementioned CSI-RS/DM-RS quasi-co-location signaling. A motivation for following this approach is rooted in avoiding additional dynamic signaling. If CSI-RS/DM-RS signaling is available, dynamic signaling between a CRS and the DM-RS can be provided by linking CSI-RS resources with a specific CRS. The UE is informed that the DM-RS in a subframe is quasi-co-located with a CSI-RS. The linkage between the CSI-RS resource and the CRS enables the UE to deduce that the DM-RS in the subframe is quasi-co-located with a CRS of a particular physical cell ID.

The above signaling which links a specific CSI-RS resource with a CRS associated with a specific physical cell ID may be performed in various ways. In some embodiments, the signaling may be provided by RRC configuration and may be included as part of the CSI-RS configuration. Specifically, each CSI-RS resource may include a field that links this specific CSI-RS resource with a certain physical cell ID and hence, the CRS associated with that physical cell ID. In some embodiments, the signaling is optional. If the CSI-RS and CRS are not linked, the specific CSI-RS resource may not be assumed as quasi-co-located with any CRS.

In another embodiment, the CSI-RS/CRS signaling may be provided as part of the CSI-RS/DM-RS quasi-co-location signaling. As discussed, CSI-RS/DM-RS quasi-co-location may be tied to a virtual cell ID or some other form of implicit signaling. This signaling can be viewed as effectively providing the UE with a number of RRC-configured parameter sets among which one parameter set is selected by dynamic signaling (e.g., using the SCID bit as discussed above). The CSI-RS/CRS quasi-co-location signaling may be added to each of these parameter sets which incorporates this signaling more directly into the CSI-RS/DM-RS signaling framework. One benefit of performing signaling in this way is that the linkage between a CSI-RS resource and a CRS is only needed for those CSI-RS resources for which dynamic signaling may actually be provided. This may simplify the signaling in cases where the dynamic CSI-RS/DM-RS signaling only applies to certain CSI-RS resources.

In another aspect, relating to the signaling of the quasi-co-location assumptions, the signaling may depend on which DCI format schedules the PDSCH transmission. For example, the implicit signaling based on virtual cell IDs may apply only when the UE is scheduled by DCI format 2C or one of its extensions. When the UE is scheduled through DCI format 1A, another set of signaling assumptions may be used that could be entirely different from any of the signaling options associated with DCI format 2C or one of its extensions. Such behavior is motivated by the fact that DCI format 1A is mainly used for fallback transmissions. To align such fallback operation with the behavior of legacy releases, it may be desirable to signal a different quasi-co-location behavior. For example, the UE may assume, when scheduled through DCI format 1A, that all of CRS, CSI-RS, and DM-RS are quasi-co-located. Alternatively, specific assumptions may be signaled through RRC-configuration such as a specific CSI-RS resource and/or a specific CRS that should be assumed as quasi-co-located with the DM-RS. No dynamic signaling may be needed in this case as DCI format 1A does not provide dynamic signaling to select among multiple virtual cell IDs.

In another aspect, quasi-co-location signaling of CSI-RS and CRS may be provided for EPDCCH transmissions. The signaling may be performed in line with the above proposals and may comprise selecting one of several candidate sets of quasi-co-location parameters. Each of these parameter sets may be associated with a certain EPDCCH decoding set that is RRC signaled to the UE. For example, for each potential EPDCCH decoding alternative (or for each configured set of decoding alternatives) the UE may be RRC-configured with a parameter set of quasi-co-location assumptions comprising indication of a specific CSI-RS resource and a specific CRS that may be assumed as quasi-co-located with the EPDCCH decoding. Such signaling may be viewed as an extension of the PDSCH signaling options described above that avoids the need for dynamic signaling which may not be applicable to EPDCCH.

Figure 9:
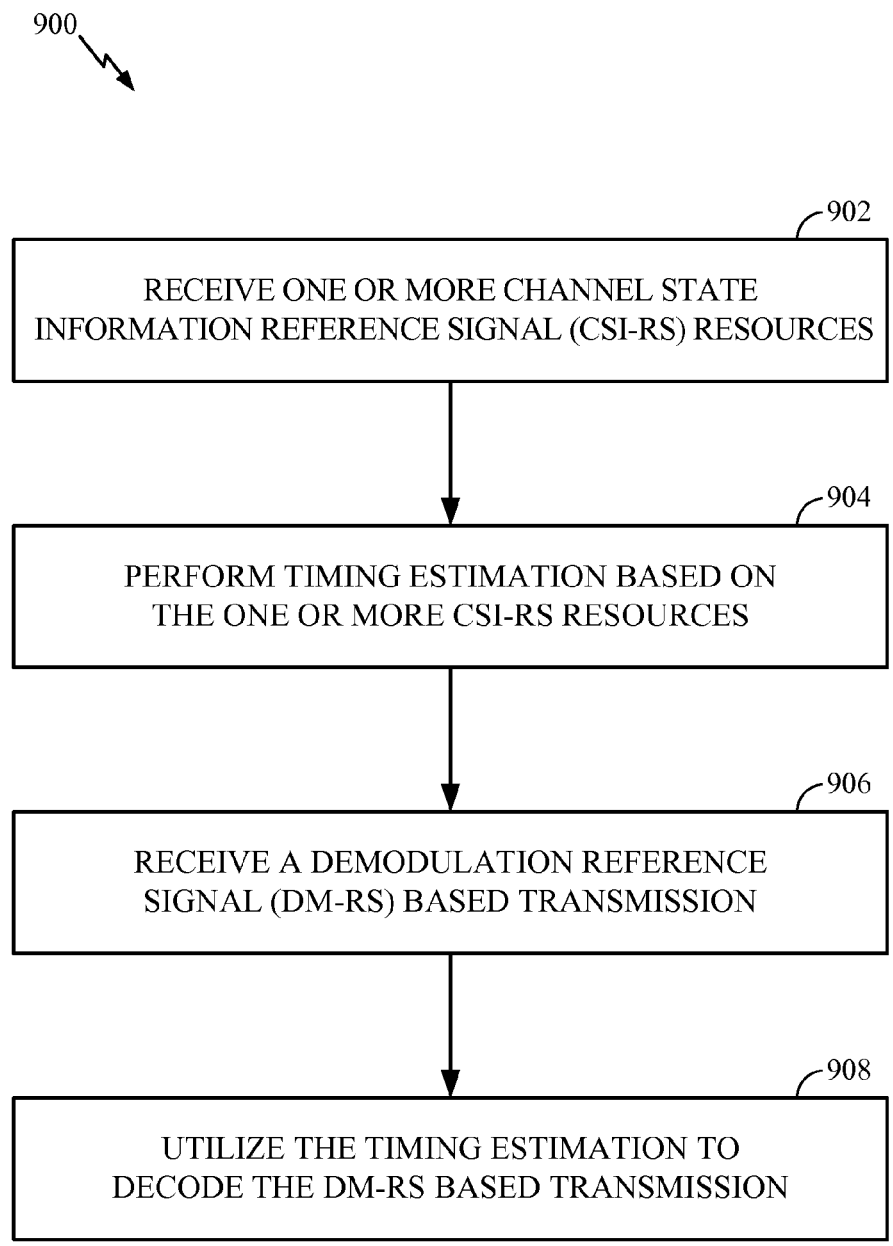
FIG. 9 illustrates example operations in accordance with certain aspects of the present disclosure.

FIG. 9 illustrates example operations 900 according to certain aspects of the present disclosure. Operations illustrated by the example method 900 may be executed, for example, by the controller/processor 380 of the UE 120 from FIG. 3.

The operation may begin, at block 902, by receiving one or more channel state information reference signal (CSI-RS) resources. The one or more CSI-RS resources are transmitted in line with the CSI-RS resource configuration signaled by higher layers (for example, it may consist of orthogonal CSI-RS resources, each corresponding to a certain transmission point). At block 904, timing estimation based on the one or more CSI-RS resources is performed. At block 906, a DM-RS based transmission is received and, at block 908, the timing estimation is utilized to decode the DM-RS based transmission.

Figure 10:
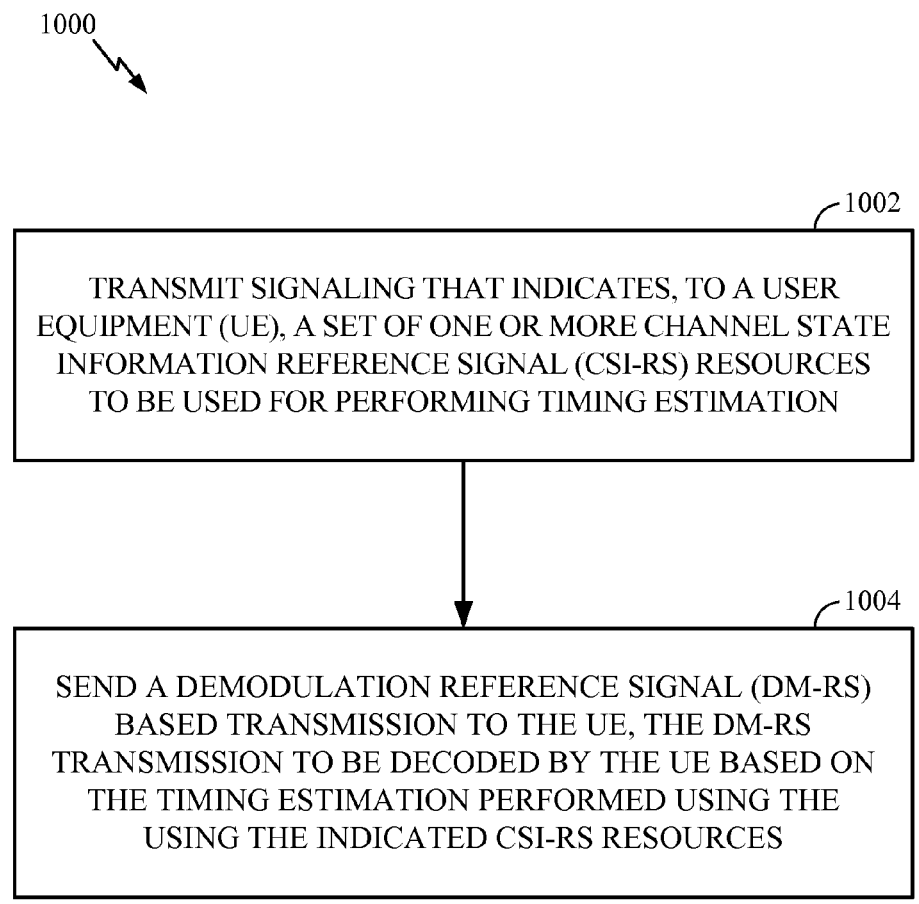
FIG. 10 illustrates example operations in accordance with certain aspects of the present disclosure.

FIG. 10 illustrates example operations 1000 according to certain aspects of the present disclosure. Operations illustrated by the example method 1000 may be executed, for example, by the controller/processor 340 of the eNB 110 from FIG. 3.

The operation may begin, at block 1002, by transmitting signaling that indicates, to a user equipment (UE), a set of one or more channel state information reference signal (CSI-RS) resources to be used for performing timing estimation. At block 1004, a DM-RS based transmission is sent to the UE. The DM-RS transmission is decoded by the UE based on the timing estimation performed using the indicated CSI-RS resources.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a UE, comprising:
    receiving one or more channel state information reference signal (CSI-RS) resources;
    performing timing estimation based on the one or more CSI-RS resources;
    receiving a demodulation reference signal (DM-RS) based transmission; and
    utilizing the timing estimation to decode the DM-RS based transmission.

2. The method of claim 1, further comprising determining which CSI-RS resources to use for performing the timing estimation.

3. The method of claim 2, wherein the determination is based, at least in part, on signaling received from a network.

4. The method of claim 3, wherein the signaling received from the network comprises a combination of:
    semi-static signaling from the network indicating one or more configuration states, wherein each configuration state is associated with one CSI-RS resource; and
    dynamic signaling indicating which of the one or more configuration states should be utilized for performing the timing estimation.

5. The method of claim 3, wherein the signaling indicates CSI-RS resources to be used for performing the timing estimation via at least one bit included in a grant associated with the DM-RS based transmission.

6. The method of claim 3, wherein the determination is based, at least in part, on the type of grant associated with the DM-RS based transmission.

7. The method of claim 5, wherein the signaling indicates CSI-RS resources to be used for performing the timing estimation via a scrambling code identity (SCID) bit in the grant.

8. The method of claim 3, wherein:
    the signaling is provided in a first subframe; and
    the DM-RS based transmission is transmitted in a second subframe subsequent to the first subframe.

9. The method of claim 3, wherein the CSI-RS resource to be used for timing estimation is selected as the one for which an aperiodic feedback report has been reported or requested most recently.

10. The method of claim 3, wherein the determination is based on a virtual cell ID.

11. The method of claim 2, wherein the determination is dependent, at least in part, on a type of subframe.

12. The method of claim 11, wherein:
the CSI-RS resources used for timing estimation are dependent, at least in part, on whether a subframe containing the CSI-RS is subject to reduced interference by other transmission points.

13. The method of claim 2, wherein:
the one or more CSI-RS resources are received from a plurality of transmission points; and
determining which CSI-RS resources to use for performing the timing estimation comprises determining CSI-RS resources from a single transmission point of the plurality of transmission points.

14. The method of claim 13, wherein:
the DM-RS is received from the single transmission point in a first subframe.

15. The method of claim 14, further comprising:
determining CSI-RS resource from another single transmission point of the plurality of transmission points to use for performing another timing estimation;
receiving another DM-RS signal based transmission from the other single transmission point in a second subframe; and
utilizing the other timing estimation to decode the other DM-RS based transmission.

16. The method of claim 1, wherein the DM-RS based transmission comprises a data transmission.

17. The method of claim 1, wherein the DM-RS based transmission comprises control information.

18. The method of claim 17, wherein the DM-RS based transmission comprises an enhanced physical downlink control channel (EPDCCH).

19. The method of claim 18, wherein:
the EPDCCH comprises multiple decoding sets; and
the determination of the CSI-RS resource associated with the DM-RS based transmission depends, at least in part, on signaling received by the network that associates each of the decoding sets with a CSI-RS resource.

20. A method for wireless communications by a base station (BS), comprising:
transmitting signaling that indicates, to a user equipment (UE), a set of one or more channel state information reference signal (CSI-RS) resources to be used for performing timing estimation; and
sending a demodulation reference signal (DM-RS) based transmission to the UE, the DM-RS transmission to be decoded by the UE based on the timing estimation performed using the indicated CSI-RS resources.

21. The method of claim 20, wherein the signaling comprises a combination of:
semi-static signaling indicating one or more configuration states, wherein each configuration state is associated with one CSI-RS resource; and
dynamic signaling indicating which of the one or more configuration states should be utilized for performing the timing estimation.

22. The method of claim 20, wherein the signaling indicates CSI-RS resources to be used for performing the timing estimation via at least one bit included in a grant associated with the DM-RS based transmission.

23. The method of claim 22, wherein the indication is based, at least in part, on the type of grant associated with the DM-RS based transmission.

24. The method of claim 22, wherein the signaling indicates CSI-RS resources to be used for performing the timing estimation via a scrambling code identity (SCID) bit in the grant.

25. The method of claim 20, wherein:
the signaling is provided in a first subframe; and
the DM-RS based transmission is transmitted in a second subframe subsequent to the first subframe.

26. The method of claim 20, wherein the CSI-RS resource to be used for timing estimation is selected as the one for which an aperiodic feedback report has been reported or requested most recently.

27. The method of claim 20, wherein the signaling is based on a virtual cell ID.

28. The method of claim 20, wherein the CSI-RS resources to be used depend, at least in part, on a type of subframe.

29. The method of claim 28, wherein:
the CSI-RS resources used for timing estimation are dependent, at least in part, on whether a subframe containing the CSI-RS is subject to reduced interference by other transmission points.

30. The method of claim 20, wherein the DM-RS based transmission comprises a data transmission.

31. The method of claim 20, wherein the DM-RS based transmission comprises control information.

32. The method of claim 31, wherein the DM-RS based transmission comprises an enhanced physical downlink control channel (EPDCCH).

33. The method of claim 32, wherein:
the EPDCCH comprises multiple decoding sets; and
the signaling associates each of the decoding sets with a CSI-RS resource.

34. An apparatus for wireless communications, comprising:
means for receiving one or more channel state information reference signal (CSI-RS) resources;
means for performing timing estimation based on the one or more CSI-RS resources;
means for receiving a demodulation reference signal (DM-RS) based transmission; and
means for utilizing the timing estimation to decode the DM-RS based transmission.

35. The apparatus of claim 34, further comprising means for determining which CSI-RS resources to use for performing the timing estimation.

36. The apparatus of claim 35, wherein the determination is based, at least in part, on signaling received from a network.

37. The apparatus of claim 36, wherein the signaling received from the network comprises a combination of:
semi-static signaling from the network indicating one or more configuration states, wherein each configuration state is associated with one CSI-RS resource; and
dynamic signaling indicating which of the one or more configuration states should be utilized for performing the timing estimation.

38. The apparatus of claim 36, wherein the signaling indicates CSI-RS resources to be used for performing the timing estimation via at least one bit included in a grant associated with the DM-RS based transmission.

39. The apparatus of claim 36, wherein the determination is based, at least in part, on the type of grant associated with the DM-RS based transmission.

40. The apparatus of claim 38, wherein the signaling indicates CSI-RS resources to be used for performing the timing estimation via a scrambling code identity (SCID) bit in the grant.

41. The apparatus of claim 36, wherein:
the signaling is provided in a first subframe; and
the DM-RS based transmission is transmitted in a second subframe subsequent to the first subframe.

42. The apparatus of claim 36, wherein the CSI-RS resource to be used for timing estimation is selected as the one for which an aperiodic feedback report has been reported or requested most recently.

43. The apparatus of claim 36, wherein the determination is based on a virtual cell ID.

44. The apparatus of claim 35, wherein the determination is dependent, at least in part, on a type of subframe.

45. The apparatus of claim 44, wherein:
the CSI-RS resources used for timing estimation are dependent, at least in part, on whether a subframe containing the CSI-RS is subject to reduced interference by other transmission points.

46. The apparatus of claim 34, wherein the DM-RS based transmission comprises a data transmission.

47. The apparatus of claim 34, wherein the DM-RS based transmission comprises control information.

48. The apparatus of claim 47, wherein the DM-RS based transmission comprises an enhanced physical downlink control channel (EPDCCH).

49. The apparatus of claim 48, wherein:
the EPDCCH comprises multiple decoding sets; and
the determination of the CSI-RS resource associated with the DM-RS based transmission depends, at least in part, on signaling received by the network that associates each of the decoding sets with a CSI-RS resource.

50. An apparatus for wireless communications, comprising:
means for transmitting signaling that indicates, to a user equipment (UE), a set of one or more channel state information reference signal (CSI-RS) resources to be used for performing timing estimation; and
means for sending a demodulation reference signal (DM-RS) based transmission to the UE, the DM-RS transmission to be decoded by the UE based on the timing estimation performed using the indicated CSI-RS resources.

51. The apparatus of claim 50, wherein the signaling comprises a combination of:
semi-static signaling indicating one or more configuration states, wherein each configuration state is associated with one CSI-RS resource; and
dynamic signaling indicating which of the one or more configuration states should be utilized for performing the timing estimation.

52. The apparatus of claim 50, wherein the signaling indicates CSI-RS resources to be used for performing the timing estimation via at least one bit included in a grant associated with the DM-RS based transmission.

53. The apparatus of claim 52, wherein the indication is based, at least in part, on the type of grant associated with the DM-RS based transmission.

54. The apparatus of claim 52, wherein the signaling indicates CSI-RS resources to be used for performing the timing estimation via a scrambling code identity (SCID) bit in the grant.

55. The apparatus of claim 50, wherein:
the signaling provides signaling in a first subframe; and
the DM-RS based transmission is transmitted in a second subframe subsequent to the first subframe.

56. The apparatus of claim 50, wherein the CSI-RS resource to be used for timing estimation is selected as the one for which an aperiodic feedback report has been reported or requested most recently.

57. The apparatus of claim 50, wherein the signaling is based on a virtual cell ID.

58. The apparatus of claim 50, wherein the CSI-RS resources to be used depend, at least in part, on a type of subframe.

59. The apparatus of claim 58, wherein:
the CSI-RS resources used for timing estimation are dependent, at least in part, on whether a subframe containing the CSI-RS is subject to reduced interference by other transmission points.

60. The apparatus of claim 50, wherein the DM-RS based transmission comprises a data transmission.

61. The apparatus of claim 50, wherein the DM-RS based transmission comprises control information.

62. The apparatus of claim 61, wherein the DM-RS based transmission comprises an enhanced physical downlink control channel (EPDCCH).

63. The apparatus of claim 62, wherein:
the EPDCCH comprises multiple decoding sets; and
the signaling provides signaling that associates each of the decoding sets with a CSI-RS resource.

64. A user equipment, comprising:
at least one processor; and
a memory coupled to said at least one processor, wherein said at least one processor is configured to receive one or more channel state information reference signal (CSI-RS) resources, perform timing estimation based on the one or more CSI-RS resources, receive a demodulation reference signal (DM-RS) based transmission, and utilize the timing estimation to decode the DM-RS based transmission.

65. A base station, comprising:
at least one processor; and
a memory coupled to said at least one processor, wherein said at least one processor is configured to transmit signaling that indicates, to a user equipment (UE), a set of one or more channel state information reference signal (CSI-RS) resources to be used for performing timing estimation, and send a demodulation reference signal (DM-RS) based transmission to the UE, the DM-RS transmission to be decoded by the UE based on the timing estimation performed using the indicated CSI-RS resources.

66. A non-transitory computer readable medium having instructions stored thereon, the instructions executable by one or more processors for:
receiving one or more channel state information reference signal (CSI-RS) resources;
performing timing estimation based on the one or more CSI-RS resources;
receiving a demodulation reference signal (DM-RS) based transmission; and
utilizing the timing estimation to decode the DM-RS based transmission.

67. A non-transitory computer readable medium having instructions stored thereon, the instructions executable by one or more processors for:
transmitting signaling that indicates, to a user equipment (UE), a set of one or more channel state information reference signal (CSI-RS) resources to be used for performing timing estimation; and sending a demodulation reference signal (DM-RS) based transmission to the UE, the DM-RS transmission to be decoded by the UE based on the timing estimation performed using the indicated CSI-RS resources.

* * * * *